Oct. 22, 1963 W. A. WILLIAMS 3,107,624
HYDRAULICALLY-OPERATED AUTOMATIC AIR RELEASE VALVE
FOR PULSATING-PRESSURE PUMPS
Filed June 12, 1961 2 Sheets-Sheet 2

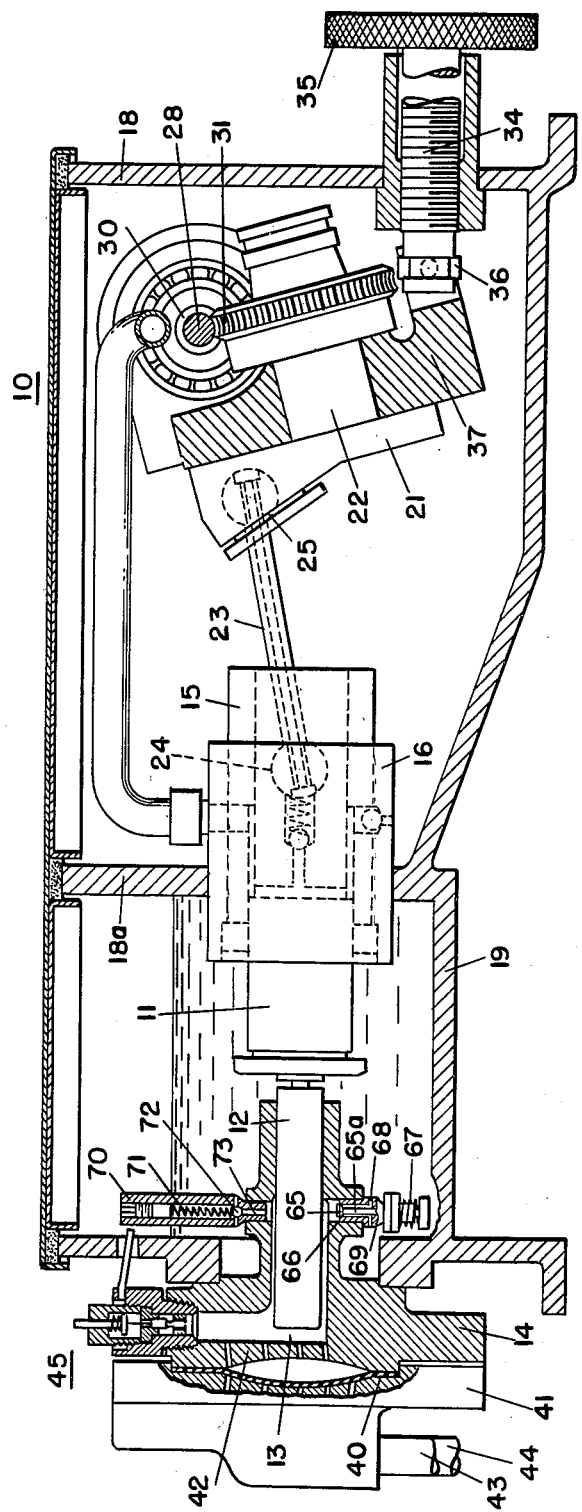

3,107,624
Patented Oct. 22, 1963

3,107,624
HYDRAULICALLY-OPERATED AUTOMATIC AIR RELEASE VALVE FOR PULSATING-PRESSURE PUMPS
William A. Williams, Philadelphia, Pa., assignor to Milton Roy Company, St. Petersburg, Fla., a corporation of Pennsylvania
Filed June 12, 1961, Ser. No. 116,441
7 Claims. (Cl. 103—44)

This invention relates to hydraulically-operated automatic air release valves and has for an object the provision of a valve which may be used to automatically release air or other gases present in the hydraulic fluid in a hydraulic pulsating-pressure pump.

The present invention is particularly applicable to accurate metering pumps of the positive displacement type which employ a hydraulic fluid between a piston and a diaphragm for actuating the latter. Pumps of this type are particularly useful in dispensing chemical liquids and other fluids and it is important that they have a high degree of accuracy. In a hydraulic system to which motive power is transmitted by a reciprocal piston, the presence of air or other gas in the hydraulic system provides a cushion which prevents effective transmission of pressure to all parts of the hydraulic system. This is an undesirable condition for effective power transmission and if the air or other gas is allowed to remain in the system, it will be compressed on the pressure stroke of the pump thereby resulting in a loss of the metering accuracy.

Various arrangements have been utilized in the past for stabilizing the hydraulic pressure in hydraulic pulsating pressure pumps. One such prior arrangement has been the use of a metering valve to provide intermittent communication between the pumping chamber and a crankcase which was open to atmosphere. At intervals during the operation of such apparatus free passage exists between the hydraulic fluid in the pumping or displacement chamber and the atmosphere. Such free passage results in an instantaneous, indeterminable, variable partial loss of pressure and therefore volume, directly from such displacement chamber.

In another form of automatic air release valve used heretofore, the valve was mechanically actuated from the crankshaft of the pump and served the dual function of a pressure relief valve during the complete pump cycle and at the end of each suction stroke it served as a combination "makeup" or "bleed" valve for the transmission fluid. While such arrangement has proved satisfactory for many applications, it does require precise actuation by the crankshaft of the pump which is difficult to achieve with some pump designs and is relatively expensive. Furthermore, it does not permit operation of the pump when a suction lift is required.

In accordance with the present invention, there is provided a relatively simple and inexpensive device for automatic release of air or other gases present or entering the spaces provided for hydraulic fluid in hydraulic pulsating-pressure-type pumps. The novel device operates in such manner that at no time is the pressure generated on such hydraulic fluid vented directly to the atmosphere. The release device of the present invention will operate on suction lift applications as well as high suction head applications. It requires no mechanical connection to the pump drive and thus can be located anywhere in the pumping system. For example, on remote applications where the pump is located some distance from the diaphragm chamber, the air release valve can be placed at the most convenient location in the system or if required, more than one air release valve can be used.

In accordance with the present invention, the air or other gas is released from the hydraulic transmission system of a pulsating-pressure pump without venting the system directly to atmosphere by connecting the hydraulic system, at a high point thereof, to an auxiliary chamber sealed with respect to atmosphere. During the pressure stroke of the pump, a portion of the liquid in the system and any entrapped air is forced into the auxiliary chamber and at the end of the pressure stroke, when the pressure in the displacement chamber drops and preferably before the pressure reaches suction pressure, the hydraulic system is sealed with respect to the auxiliary chamber concurrently with the unsealing of the auxiliary chamber for connection with atmosphere to release any air or other gas therefrom. The exhaust from the auxiliary chamber, when it is unsealed, is released beneath the liquid level of reservoir of hydraulic liquid for the hydraulic system.

More specifically, there is provided an automatic air release device for a hydraulic pulsating-pressure pump including a body having means for connection to the hydraulic system of the pump. The body is provided with a piston chamber having an inlet end and an outlet end, the inlet end being in communication with the pump. An annular chamber communicates with the piston chamber intermediate the ends thereof, the annular chamber being shorter in length than the piston chamber. A reciprocal piston is disposed within the piston chamber, the piston having a length greater than that of the annular chamber but less than that of the piston chamber. Stop means is provided for limiting movement of the piston in the inlet end of the piston chamber after the piston has moved to position beyond the end of the annular chamber adjacent the inlet end. The piston is yieldably held in the limiting position in the inlet end of the piston chamber and valve seat means is provided at the outlet end of the piston chamber to limit the movement of the piston in the outlet end of the piston chamber after the piston has moved to a position beyond the adjacent end of the annular chamber and to cooperate with the piston in sealing the outlet end of the piston chamber with respect to the annular chamber. The body of the air release device is adapted to be supported in reservoir means of hydraulic fluid for the pump and at a location beneath the liquid level of the reservoir means.

Further in accordance with the invention, the reservoir means includes a pressure relief valve and a refill valve, both in flow connection with the displacement chamber of the pump and the air release device.

For a more detailed disclosure of the invention and for further objects and advantages thereof, reference is to be had to the following description, taken in conjunction with the accompanying drawings in which:

FIG. 1 is a sectional elevation view of a diaphragm pump embodying the automatic air release device of the present invention;

Figure 4:
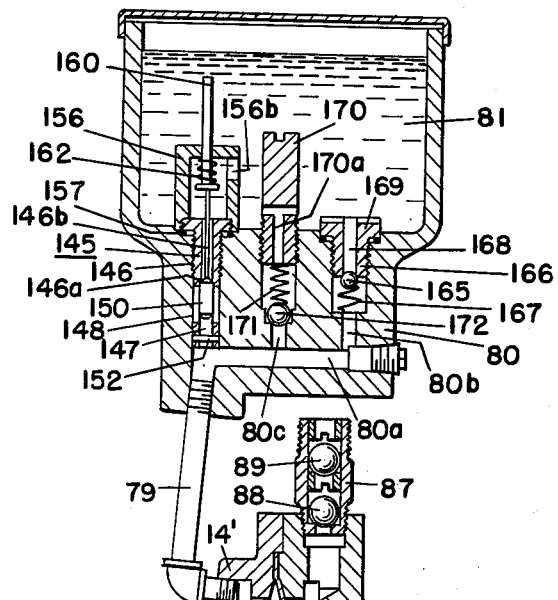
FIG 4 is a sectional view of a modification of the present invention.

Referring to FIG. 1, the invention in one form has been illustrated in connection with a stroke adjustment mechanism 10, for controlling the length of stroke of a crosshead 11 which drives a pump plunger 12 within a displacement chamber 13 located internally of a pump housing 14. The stroke adjustment mechanism 10 may be of the type disclosed and claimed in Saalfrank Patent No. 2,892,352 or in Williams application, Serial No. 47,037, filed August 2, 1960, now Patent No. 3,075,613.

The Williams patent discloses a lubricating pump incorporated in the crosshead of a controlled volume pump for providing positive lubrication for the bearing connections of the connecting link between the crosshead and stroke adjustment mechanism. While such pressure lubricating arrangement is applicable to the pump shown in the present application, it does not form a part of the present invention.

The crosshead 11 is adapted to reciprocate within a bearing sleeve 15 disposed within a tubular support 16 which in turn extends through the forward vertical wall 18a of a housing 18 for the stroke adjustment mechanism 10. On the opposite side of the forward wall 18a is a sump 19 which is adapted to be filled with a hydraulic fluid, such as oil, up to the indicated level. The lower portion of the housing 18 provides a crankcase for a supply of lubricating oil. The crosshead 11 is adapted to be reciprocated by the variable stroke adjustment mechanism 10 which includes a rotary crank 21 which is secured to one end of a driven shaft 22. The crosshead 11 and the crank 21 are interconnected by means of a connecting link 23, the opposite ends of which are provided with ball members 24 and 25 to provide bearing connections respectively with the crosshead 11 and the crank 21. As described in the aforesaid copending application, the crosshead 11 includes provisions for pumping a lubricant from the crankcase through a flow passage extending axially of the connecting link 23 to provide positive lubrication for the ball members 24 and 25. A drive shaft 28 which is adapted to be driven from a suitable drive motor, not shown, is provided with a worm 30 which meshes with and rotates a driven worm gear 31 secured to the driven shaft 22. When the variable stroke mechanism 10 is positioned for zero stroke of the crosshead 11, the axis of the shaft 22 is coaxial with the axis of the crosshead 11.

In FIG. 1, the stroke adjustment screw 34 has been adjusted by means of knob 35 for substantially maximum stroke. The inner end of the screw 34 is connected at 36 to the lower end of a sub-frame or gear box 37. The upper end of the gear box 37 is provided with a pair of spaced ear members, only one of which is shown, having openings therethrough for rotatably supporting the gear box 37 for pivotal movement thereof about the axis of the drive shaft 28 by means of the stroke adjustment screw 34. The parts have been illustrated in FIG. 1 with the plunger 12 in the forward position at the end of the pressure stroke.

In communication with the chamber 13 is a flexible moving wall or diaphragm 40, the outer edges of which are adapted to be held between flanges on the respective housing members 14 and 41. The diaphragm 40, which is formed from suitable material, for example rubber, or plastic material forms the moving wall of the chamber 13 and is protected in its two limited positions by a pair of spaced perforated walls, only one of which wall 42 is in housing 14. The other perforated wall is contained in housing member 41 which likewise includes suitable inlet and outlet valve means indicated by reference characters 43 and 44, the latter arrangement being well-known in the art. The hydraulic transmission fluid fills all of the space in the chamber 13 to the right of the diaphragm 40.

Figure 2:
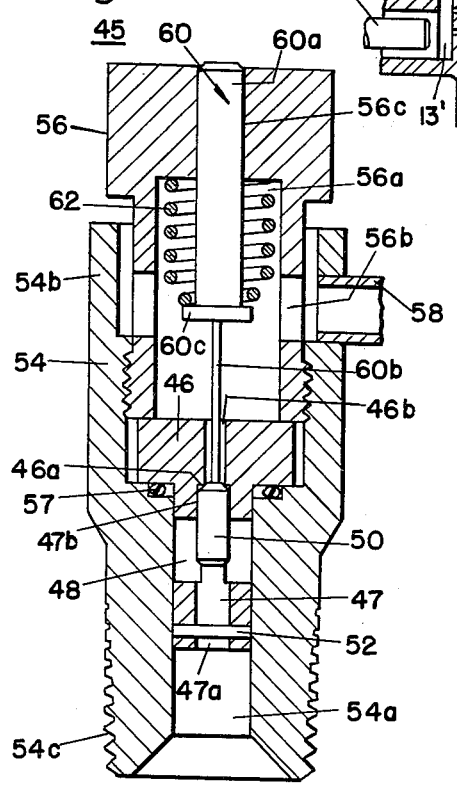
FIG. 2 is an enlarged sectional view of the automatic air release device with the parts thereof positioned after the beginning of the discharge stroke of the pump.

In accordance with the present invention, the housing 14 is provided with an automatic air release device 45 which communicates with the pump chamber 13 and is adapted to release air or other gas from the hydraulic transmission system of the pulsating-pressure pump without venting the system directly to atmosphere. Referring to FIG. 2, it will be seen that the air release device 45, shown in FIG. 1, is illustrated on enlarged scale. The air release device 45 includes a body member 46 having means for connection to the hydraulic system of the pump. The body 46 in the form of a slotted guide-cylinder is provided with a piston chamber 47 having an inlet end 47a and an outlet end 47b. The inlet end 47a of the piston chamber is in communication with the pump chamber 13, FIG. 1. An annular chamber 48 formed by the slots in the guide cylinder extends around the piston chamber in communicating relation intermediate the inlet and outlet ends 47a and 47b respectively. The annular chamber 48 is shorter in axial length than the piston chamber 47. A piston 50 is disposed within the piston chamber 47 and has a length greater than that of the annular chamber 48 but less than that of the piston chamber 47. A stop means, such as the cross pin 52, is provided, limiting movement of the piston 50 toward the inlet end 47a of the piston chamber 47 after the piston 50 has moved to a position beyond the end of the annular chamber adjacent the inlet end 47a.

The body 46 is disposed in a flow passage 54a of an adaptor 54, the upper end 54b of which serves as a reservoir for hydraulic liquid. The lower end of adaptor 54 is provided with external threads 54c which threadedly engage a threaded opening in the upper region of pump chamber 13, FIG. 1. The body member 46 is held in place within the adapter 54 by means of a cap 56, the lower end of which threadedly engages cooperating threads in the upper region of member 54. The cap 56 holds the body member 46 against the O-ring 57 to form a seal with the adaptor 54. Thus the hydraulic fluid can only pass through the flow passages in the body member 46 and not around it. The cap 56 is provided with an inner chamber 56a which cooperates with the adaptor 54 in providing a reservoir for hydraulic fluid. The side wall of the cap 56 is provided with one or more openings 56b which communicate with a drain tube 58 inserted in the side wall of the adaptor 54, the drain tube 58 providing for overflow and return of the hydraulic fluid to the main reservoir or sump 19, as shown in FIG. 1.

The piston 50 is provided with an actuator 60, the upper end of which is of enlarged diameter 60a and is adapted to reciprocate within the vertical opening 56c in the cap 56, FIG. 2. The lower end of the actuator 60 is provided with a section 60b of small diameter which is adapted to extend through the flow passage 46b in the body member 46 which connects with the outlet end 47b of piston chamber 47. The actuator 60 is provided with an enlarged shoulder 60c which is adapted to engage the lower end of a coil spring 62, the upper end of which engages the top of the chamber 56a formed in the cap 56.

Figure 3:
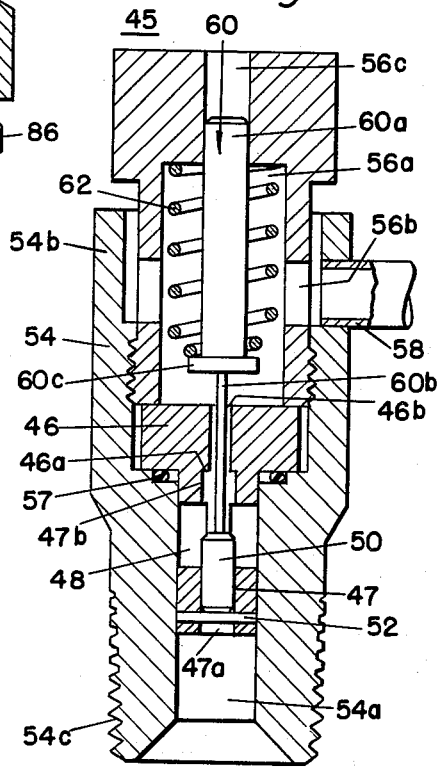
FIG. 3 is an enlarged sectional view of the air release device with the parts thereof positioned after the start of the suction stroke of the pump.

The spring 62 normally moves the actuator 60 to its lower position, as shown in FIG. 3, thus forcing the piston 50 to its lower position against the stop pin 52. However, in FIG. 1, the pump plunger 12 is shown on the discharge stroke. After the plunger 12 starts the discharge stroke, the pressure within the piston chamber 47 and annular chamber 48 corresponds to the discharge pressure $P_d$, thus causing the piston 50 to move upwardly to the position shown in FIG. 2, forming a tight seal against the valve seat 46a at the outlet end 47b of the piston chamber 47 preventing escape of hydraulic fluid through the passage 46b. Any air or other gas in the displacement chamber 13 of the pump rises into the two annular spaces which form the annular chamber 48 around the sides of the piston 50. At the end of the pressure stroke, the pressure in the displacement chamber 13 drops and before the pressure reaches suction pressure $P_s$, the spring 62 quickly moves the piston 50 to the lower position shown in FIG. 3. The rapid return of the piston 50 before the pressure has fully dropped to suction pressure $P_s$ traps the air in the annular chamber 48 around the piston 50. Then on the return stroke or suction stroke of the plunger 12, the annular chamber 48 is vented to atmospheric pressure $P_a$ and the air can escape. It will be noted that the exhaust from the air release valve 45 is flooded with oil or other hydraulic fluid. This condition is maintained during the operation of the pump once the reservoir within the chamber 56a is filled with oil, the latter being accomplished before the pump is put into operation.

The clearance between the piston 50 and the valve body 46 should be small, but not critically small. During the period that the piston 50 moves, there is only a slight pressure drop across it and therefore only a slight tendency for leakage to occur. It will be noted that the piston 50 is longer than the annular chamber 48 around it so that at no time is there free passage around the piston 50 for easy escape of the hydraulic fluid. The use of a valve seat 46a at the discharge end of the body 46 permits the use of reasonable machining tolerances and thus lowers the cost of the valve.

The air release valve 45 preferably is incorporated in the hydraulic transmission system at the highest point thereof, as air tends to move upwardly through hydraulic fluids and collect at high points where it may more conveniently be released. If the hydraulic system has more than one high point, such valves may be placed at each such high point so that air collecting at any or all such points may be released from the hydraulic system.

When the reciprocal plunger 12 of the pump is moving on its forward or discharge stroke, the pressure created by it within the hydraulic system is transmitted equally to all parts of that system including the piston chamber 47 of the air release device 45. Such pressure is exerted against the piston 50 causing it to overcome the opposing pressure transmitted to the piston 50 by the compression spring 62. When the pressure of the compression spring 62 against the piston 50 is exceeded by the pressure of the hydraulic fluid, the piston 50 is moved from the inlet end 47a of the guide cylinder or piston chamber 47 towards the discharge end 47b. Any air or other gas under or adjacent to the upwardly moving piston 50 is forced upwardly with the piston 50 until the upper end of the piston 50 seats itself against the valve seat 46a provided at the discharge end 47b of the piston chamber 47. This air or other gas, together with a relatively small amount of hydraulic fluid, is injected into the annular chamber 48 formed by the guide cylinder slots of body 46 by hydraulic pressure but is prevented from going any further than the annular chamber 48 by the piston 50 seating itself against the seat 46a at the discharge end of chamber 47, FIG. 2.

As the pump plunger 12 nears the end of its discharge stroke and before beginning its suction stroke, the force exerted by the compression spring 62 overcomes the pressure transmitted by the hydraulic fluid against the piston 50 and forces the piston 50 towards the inlet end 47a of the chamber 47 in body member 46. The piston 50 thus effectively prevents air or other gas in the annular chamber 48 from returning to the hydraulic system, FIG. 3. This air or other gas plus a small amount of hydraulic fluid occupying the annular chamber 48 is now free to expand out through the discharge end 47b of chamber 47 and through the discharge passage 46b in the upper end of body member 46, whence the fluid may be conducted into a convenient sump as by tube 58 or drained to waste. In this manner, air or other gas may be released from the hydraulic system.

It will be noted that the slots in the body member 46 which form the annular chamber 48 constitute a definite unvarying space and that the piston 50 in its limited movement inside the piston chamber 47 between the valve seat 46a and pin 52 occludes and subsequently releases a certain definite volume of gas-liquid, inside the annular chamber 48 (at a given pressure), during each cycle of the piston 50. The quantity of hydraulic fluid moving through the air release valve is a positive controlled displacement loss. This is to be distinguished from prior arrangements where the displacement chamber is momentarily connected to atmosphere resulting in a loss of gas-liquid which is indeterminate.

While the air release valve 45 causes a reduction in displacement, the amount of hydraulic liquid displaced is small and constant (not a variable loss) so that only a simple adjustment of the zero setting of the reciprocable pump plunger 12 is necessary to correct for such displacement loss.

In diaphragm pumps, such for example, as the one illustrated in FIG. 1, it is desirable not only to provide for air release as by the novel air release valve device 45, but also to provide for replenishing the hydraulic fluid lost from the displacement chamber 13 due to leakage and also to provide a relief valve to permit escape of fluid in the event that too much gets into the chamber 13 or to release the fluid in the event that excessive pressure develops in the system. In FIG. 1, the housing 14 has been provided with the various valve means to accomplish these functions. The air release valve device 45 has already been described. To replenish the hydraulic fluid in the displacement chamber 13, the latter is provided with a refill valve 65 which communicates through the wall of housing 14 with the displacement chamber 13. The refill valve 65 is disposed beneath the liquid level in the reservoir or sump 19 and is adapted to supply makeup fluid to the displacement chamber 13 as may be required due to any leakage. The refill valve 65 does not let air into the system. The refill valve 65 is normally held in closed position on seat 66 by a spring 67. When spring 67 is compressed as by suction within chamber 13, the valve 65 is lifted off of its seat 66 thus connecting chamber 13 with the liquid in sump 19 by way of the passage 68 which extends through the valve housing 69 and upwardly along the stem 65a of valve 65 to the seat 66. The pressure relief function is provided by means of a relief valve 70 which also is flow connected to the displacement chamber 13. A spring member 71, the pressure of which may be adjusted, yieldably holds a ball member 72 against a seat normally closing the passage 73 to the displacement chamber 13. When the pressure within the chamber 13 exceeds the pressure for which the spring 71 is set, the ball 72 will be raised off from its seat permitting escape of fluid from the chamber 13 into the reservoir or sump 19.

While the present invention has been described in connection with the arrangement shown in FIG. 1, where the air release valve 45 has been directly inserted into the housing of the displacement chamber 13, it is to be understood that such novel air release valve, as well as the makeup valve and the pressure relief valve, may be readily added to existing pumping systems. Such an arrangement is illustrated in FIG. 4 where the pump housing 14' has been provided with a flow passage or pipe 79 which is inclined upwardly and to the upper end of which is connected a housing 80 including a reservoir for the hydraulic liquid 81. The housing or reservoir means 80 is provided with an air release valve device 145 which operates in similar manner to the air release device 45 previously described. The body member 146 includes a piston chamber 147 within which reciprocates a piston 150 and around which extends an annular chamber 148 formed by a pair of slots in the guide cylinder or body member 146. The body member 146 is adapted to be threadedly secured in a corresponding threaded opening in the housing 80. The opening for the air release valve 145 is flow connected by a flow passage 80a to the pump displacement chamber 13' as are the recesses for the pressure relief valve 170 and the makeup valve 165.

The air release valve 145 is provided with a stop pin 152 which limits movement of the piston 150 toward the inlet end of the piston chamber 147 after the piston 150 has moved to a position beyond the end of the annular chamber 148 adjacent the inlet end. The piston 150 is adapted normally to be held against the stop pin or cross pin 152 by an actuator 160, the upper end of which is of enlarged diameter and is adapted to reciprocate within the opening in the cap 156. The lower end of the actuator 160 is of small diameter and is adapted to extend through the flow passage 146b in the body member 146, which flow passage 146b at its lower end connects with the outlet end of the piston chamber 147. The coil spring 162, which is positioned between the enlarged shoulder on the actuator 160 and the cap 156, yieldably holds the piston 150 against the stop 152. The air release valve 145 operates in the same manner as air release valve 45 previously described in connection with FIGS. 1–3. The cap 156 is provided with an opening or port 156b which permits a transfer of reservoir liquid 81 between the inside of cap 156 and reservoir 80. Thus the piston 150 of the air release valve 145 always operates beneath a liquid level. A seal in the form of an O-ring 157 is positioned between the housing 89 and the body member 146 to prevent liquid in the reservoir 80 from flowing along the outside of the body member 146 and into the annular chamber 148 or the piston chamber 147.

The pressure relief valve 170 is similar to the pressure relief valve 70 previously described. The pressure relief valve 170 includes a ball member 172 which is yieldably held against a seat, by a spring member 171, normally closing the passage 80c which connects by way of flow passage 80a and pipe 79 to the displacement chamber 13'. The pressure of the spring 171 on the ball 172 may be adjusted by rotating the threaded valve member 170, through which extends the exhaust passage 170a. When the pressure within the chamber 13' exceeds the pressure setting for spring 171, the ball 172 will be raised off from its seat permitting escape of fluid from the chamber 13' into the reservoir 80.

The refill valve 165 permits the replenishment of the hydraulic fluid in the displacement chamber 13' by fluid 81 from the reservoir 80. The refill valve 165 has been illustrated in the form of a ball which is normally held in closed position by a coil spring 167 on a seat 166 at the lower end of passage 168 which extends through the valve housing 169. When the spring 167 is compressed, as by suction within chamber 13' during the suction stroke of plunger 12', the valve 165 will be withdrawn from its seat 166, thus connecting the chamber 13' by way of pipe 79, flow passage 80a, flow passage 80b, and valve passage 168 with the liquid 81 in the reservoir 80. On the pressure stroke of the pump plunger 12' the ball valve 165 is held against the seat 166 thus preventing escape of fluid from the system.

From the foregoing description it will be seen that the modification described and illustrated in connection with FIG. 4 operates in substantially the same manner as the arrangement described and illustrated in connection with FIGS. 1–3. The pump plunger 12' of FIG. 4 may be actuated from the same type of stroke adjustment mechanism as illustrated in FIG. 1 or it may be of other suitable types, such for example as illustrated in Bennett Patent 2,975,599. The pump chamber 85 in FIG. 4 is provided with an inlet 86 and an outlet 87, each provided with a pair of ball check valves 88 and 89, similar to the arrangement shown in the aforesaid Bennett patent. It is, of course, understood, that the other valve arrangements may be utilized.

From the foregoing description of the present invention it will be seen that the air release valve, the pressure relief valve and the refill valve may be incorporated directly in the displacement chamber casting as in FIG. 1 utilizing an integrally cast reservoir or they may be disposed directly in the reservoir, separately or together, as shown in FIG. 4, without departing from the scope of the present invention. Since the air release valve is operated by pressure within the hydraulic transmission system and not mechanically, it requires no mechanical connection to the pump drive and therefore can be located anywhere in the system. Thus on remote applications where the reciprocal pump is removed some distance from the diaphragm chamber, the subject air release valve can be placed at the most convenient spot or, if required, more than one such valve can be used. While the air release valve causes a reduction in displacement, the amount of hydraulic liquid displaced is small and consistent so that only a new location of the zero setting of the reciprocal pump plunger is necessary to correct for such displacement loss.

It is to be understood that the invention is not limited to the specific arrangements shown and that changes and modifications may be made within the scope of the appended claims.

What is claimed is:

1. A method of releasing air or other gas from the hydraulic transmission system of a pulsating-pressure pump without venting the system directly to atmosphere, comprising the steps of connecting the hydraulic system at a high point thereof to an auxiliary chamber sealed with respect to atmosphere to receive a portion of the liquid in the system and any entrapped air into the auxiliary chamber during the pressure stroke of the pump, at the end of the pressure stroke when the pressure in the displacement chamber drops concurrently sealing the hydraulic system with respect to the auxiliary chamber and unsealing the auxiliary chamber for connection with atmosphere to release any air or other gas therefrom.

2. A method according to claim 1 wherein the exhaust from the auxiliary chamber when it is unsealed is released beneath the liquid level of a reservoir of hydraulic liquid for the hydraulic system.

3. An automatic air release device for the hydraulic transmission system of a pulsating-pressure pump comprising a body having a piston chamber with an inlet end and an outlet end, said body having means for connecting said inlet end to the hydraulic transmission system, an annular chamber communicating with said piston chamber intermediate said ends thereof, said annular chamber being shorter in length than said piston chamber, a reciprocable piston in said piston chamber, said piston having a length greater than that of said annular chamber but less than that of said piston chamber, stop means for limiting movement of said piston in said inlet end of said piston chamber after said piston has moved to position beyond the end of said annular chamber adjacent said inlet end, means for yieldably holding said piston in said limiting position in said inlet end, and valve seat means at said outlet end of said piston chamber to limit the movement of said piston in said outlet end of said piston chamber after said piston has moved to a position beyond the adjacent end of said annular chamber and to cooperate with said piston in sealing said outlet end of said piston chamber with respect to said annular chamber.

4. An automatic air release device according to claim 3 including reservoir means for hydraulic fluid for the pump and wherein said body is supported in said reservoir means and is positioned beneath the liquid level of said reservoir means.

5. An automatic air release device according to claim 4 wherein said reservoir means includes a pressure relief valve and a refill valve both in flow connection with said inlet end of said air release device.

6. A method of releasing air or other gas from the hydraulic transmission system of a pulsating-pressure pump without venting the system directly to atmosphere, comprising the steps of sealing an auxiliary chamber with respect to atmosphere, connecting the hydraulic system at a high point thereof to the auxiliary chamber while the latter is sealed to receive a portion of the liquid in the system and any entrapped air into the auxiliary chamber, and upon decrease in the pressure in the hydraulic system unsealing the auxiliary chamber for connection with atmosphere to release any air or other gas from the auxiliary chamber but not before sealing the hydraulic system with respect to the auxiliary chamber.

7. Apparatus for releasing air or other gas from the hydraulic transmission system of a pulsating-pressure pump without venting the system directly to atmosphere, comprising an auxiliary chamber, means for connecting the hydraulic system at a high point thereof to said auxiliary chamber, means for sealing the auxiliary chamber with respect to atmosphere for receiving in said chamber during the pressure stroke of the pump a portion of the liquid in the system and any entrapped air, and said sealing means including a pressure operated piston which has a length greater than the axial length of said auxiliary chamber and is effective at the end of the pressure stroke when the pressure in the displacement chamber drops to unseal the auxiliary chamber for connection with atmosphere to release any air or gas therefrom but not before said piston has sealed the hydraulic system with respect to said auxiliary chamber.

References Cited in the file of this patent
UNITED STATES PATENTS

| | | |
|---|---|---|
| 2,578,746 | Scherger et al. | Dec. 18, 1951 |
| 2,975,599 | Bennett | Mar. 21, 1961 |